(12) United States Patent
Joo et al.

(10) Patent No.: US 6,294,135 B1
(45) Date of Patent: Sep. 25, 2001

(54) SMALL-SCALE BOILER SYSTEM USING SCRAPPED TIRES

(75) Inventors: Seungki Joo, Sampoong Apt. 22-201, Seocho-dong, Seocho-gu, Seoul (KR); Doyoung Yoon, Seoul (KR); Changwon Park, Gainzville City, FL (US); Yongchurl Kim, Junrabuk-do (KR)

(73) Assignee: Seungki Joo, Seoul (KR)

( * ) Notice: Subject to any disclaimer, the term of this patent is extended or adjusted under 35 U.S.C. 154(b) by 0 days.

(21) Appl. No.: 09/291,041

(22) Filed: Apr. 14, 1999

(30) Foreign Application Priority Data

Jul. 14, 1998 (KR) .................................................. 98-28432
Sep. 14, 1998 (KR) .................................................. 98-37855

(51) Int. Cl.[7] ................................ F23G 5/00; B09B 3/00; F01N 3/00; B01D 53/34
(52) U.S. Cl. ........................ 422/173; 422/171; 422/172; 422/184.1; 110/215
(58) Field of Search .................................. 422/172, 173, 422/184.1, 171; 110/215, 254, 345; 201/25; 261/DIG. 72; 423/243.08

(56) References Cited

U.S. PATENT DOCUMENTS

| | | |
|---|---|---|
| 4,067,936 | * 1/1978 | Ellis et al. . |
| 4,305,909 | * 12/1981 | Willett et al. . |
| 4,753,181 | * 6/1988 | Sosnowski . |
| 4,846,082 | * 7/1989 | Marangoni . |
| 4,999,167 | * 3/1991 | Skelley et al. . |
| 5,224,431 | * 7/1993 | Lee et al. . |
| 5,662,794 | * 9/1997 | Okazoe et al. . |
| 5,730,073 | * 3/1998 | Kobata . |
| 5,885,489 | * 3/1999 | Horner et al. . |

* cited by examiner

Primary Examiner—Hien Tran
(74) Attorney, Agent, or Firm—McDermott, Will & Emery (57) ABSTRACT

A small-scale scrapped tire boiler system for heating a small-scale facility using heat generated by burning scrapped tires. The system includes a scrapped tire burner furnace, a heat exchanger for heating a cool heat transfer medium from the facility by the combustion gas from the furnace and supplying the heated medium to the facility, and an exhaust gas purifier for purifying sulfurous acid gas and carbon dust contained in exhaust gas. The purifier includes an exhaust gas tower having a vertical path to discharge the combustion gas, a water sprayer for spraying water from the upper side of the tower so that the sulfurous acid gas is made to melt to water and the carbon dust is made to adsorb to fall down, a neutralizer for precipitating sulfurous acid gas components into alkali salts in a sulfurous acid aqueous solution to thereby neutralize water, and a tank containing the solution and water. The precipitated alkali salts are removed from the bottom of the tank and the floating carbon dust is removed from the upper portion of the tank.

6 Claims, 6 Drawing Sheets

SMALL-SCALE BOILER SYSTEM USING SCRAPPED TIRES

BACKGROUND OF THE INVENTION

1. Field of the Invention

The present invention relates to a small-scale boiler system using scrapped tires, and more particularly, to a small-scale scrapped tire fired boiler system in which a high temperature combustion gas generated at the time of incinerating scrapped tires can be used for heating a small-scale facility such as a vinyl plastic hothouse, and the combustion gas can be effectively purified to thereby prevent an air pollution in advance.

2. Description of the Related Art

As automobile cars increase sharply, scrapped tires also increase in geometrical progression. Meanwhile, a scrapped tire usually consists of eight components having high energy including rubber, carbon, textile and steel. Since the energy included in a scrapped tire is above 8,000 kcal/kg higher than 6,000 kcal/kg which is the amount of heat of coal, the scrapped tire is of very high value as fuel.

When a tire is pyrolyzed, middle-classed oil between light oil and hard heavy oil and gas can be extracted at a ratio of five to one. Thus, the scrapped tire has been noted as industrial energy. As a result, various methods and apparatuses have been developed to utilize scrapped tires.

For example, scrapped rubber extracted from scrapped tires can be used as a mix when paving a road with asphalt. Also, energy generated at the time of incinerating scrapped tires is collected as a thermal source, to sharply reduce an energy cost. Further, when scrapped tires are pyrolyzed, middle-classed oil between gasoline and light oil is collected and used as fuel for a heat exchanger. At the same time, carbon black is separated from the scrapped tire and recycled at the time of manufacturing tires.

Here, when noxious, combustion gas containing sulfurous acid gas, nitrogen carbon monoxide, carbon dust, etc., which is generated at the time of obtaining thermal energy and other extracts from burning scrapped tires is leaked into atmosphere, severe air pollution may be caused.

Therefore, to prevent the air pollution, the combustion gas generated during burning the scrapped tires should be refired for perfect combustion. Otherwise, sulfurous acid gas ($SO_2$) is made to react to water ($H_2O$), to separate the sulfurous acid gas ($SO_2$) from the combustion gas, and to then be discharged in the air, using the characteristic that the former melts well by the latter.

However, in the case of the above wet removal method, combustion gas should pass through a large-scale charging material layer in order to make the combustion gas generated in a burning furnace react well to water. Thus, since it is not easy to develop a small-scale wet apparatus, the wet removal method has not been appropriate for a small-scale heating.

Also, a dry removal method using adsorption of a solid state of noxious gas requires a facility such as a very expensive air purifier. Thus, the dry removal method has not been developed for small-scale equipment.

SUMMARY OF THE INVENTION

To solve the above problems, it is an object of the present invention to provide a small-scale boiler system having an exhaust gas purifier which can effectively purify sulfurous acid gas, carbon dust, etc., contained in combustion gas (exhaust gas) when high temperature combustion gas generated by burning scrapped tires is applied to a small-scale heating.

It is another object of the present invention to provide a small-scale boiler system which quickly performs perfect combustion of nitrogen carbon monoxide which is increasingly generated at the last stage of the combustion, to then reduce an amount of discharged nitrogen carbon monoxide and shorten an ash processing period.

To accomplish the above object of the present invention, there is provided a small-scale scrapped tire boiler system for heating a small-scale facility to be heated using heat generated during burning scrapped tires, the small-scale boiler system comprising: a scrapped tire burner furnace for burning the scrapped tires and producing high-temperature combustion gas; a heat exchanger for heating a heat transfer medium by the high-temperature combustion gas generated in the burner to perform heat exchange with the cooled heat transfer medium fed back from the facility to be heated and supplying the heated heat transfer medium to the facility to be heated; and an exhaust gas purifier for purifying sulfurous acid gas and carbon dust contained in exhaust gas discharged in the air via the heat exchanger.

It is preferable that the exhaust gas purifier comprises: an exhaust gas tower having a vertical path to discharge the combustion gas having passed through the heat exchanger; a water sprayer for spraying water from the upper side of the exhaust gas tower in such a manner that the sulfurous acid gas contained in the discharged combustion gas is made to melt to water and the carbon dust is made to adsorb to fall down; and a neutralizer for precipitating sulfurous acid gas components into alkali salts in a sulfurous acid aqueous solution where the sulfurous acid gas is dissolved to thereby neutralize water.

It is also preferable that the exhaust gas purifier comprises: an exhaust gas tower having a vertical path to discharge the combustion gas having passed through the heat exchanger; a water tank communicating with the bottom side of the exhaust gas tower and containing a certain amount of purifying water; a water sprayer for circulating the purifying water and spraying water from the upper side of the exhaust gas tower; a reaction accelerator disposed at the upper side of the exhaust gas tower, lengthening a reaction time between the combustion gas and the water in such a manner that sufficient time and contact area are kept so that the sulfurous acid gas contained in the discharged combustion gas is made to be dissolved to the sprayed water; and a limestone charging layer for precipitating the sulfurous acid produced from the sulfurous acid gas dissolved while having passed through the reaction accelerator into gypsum.

According to the present invention, the burner furnace comprises: a housing forming a combustion chamber in which scrapped tires are loaded; a first light oil inlet disposed in the upper portion of the combustion chamber, for injecting a combustible material; an air heating induction pipe disposed in the inner circumferential surface of the housing; a burner disposed in a connection path connected with a heat exchanger; and a return means for returning the air heated by the burner to the combustion chamber.

It is also preferable that the burner furnace further comprises a second injection inlet disposed in the lower portion of the combustion chamber, for injecting a combustible material, and a fan for injecting the input combustible material into the inside of the combustion chamber together with the external air.

BRIEF DESCRIPTION OF THE DRAWINGS

The objects and other advantages of the present invention will become more apparent by describing in detail the structures and operations of the present invention with reference to the accompanying drawings, in which.

DETAILED DESCRIPTION OF THE EMBODIMENTS

Preferred embodiments of the present invention will be described in detail with reference to the accompanying drawings.

Figure 1:
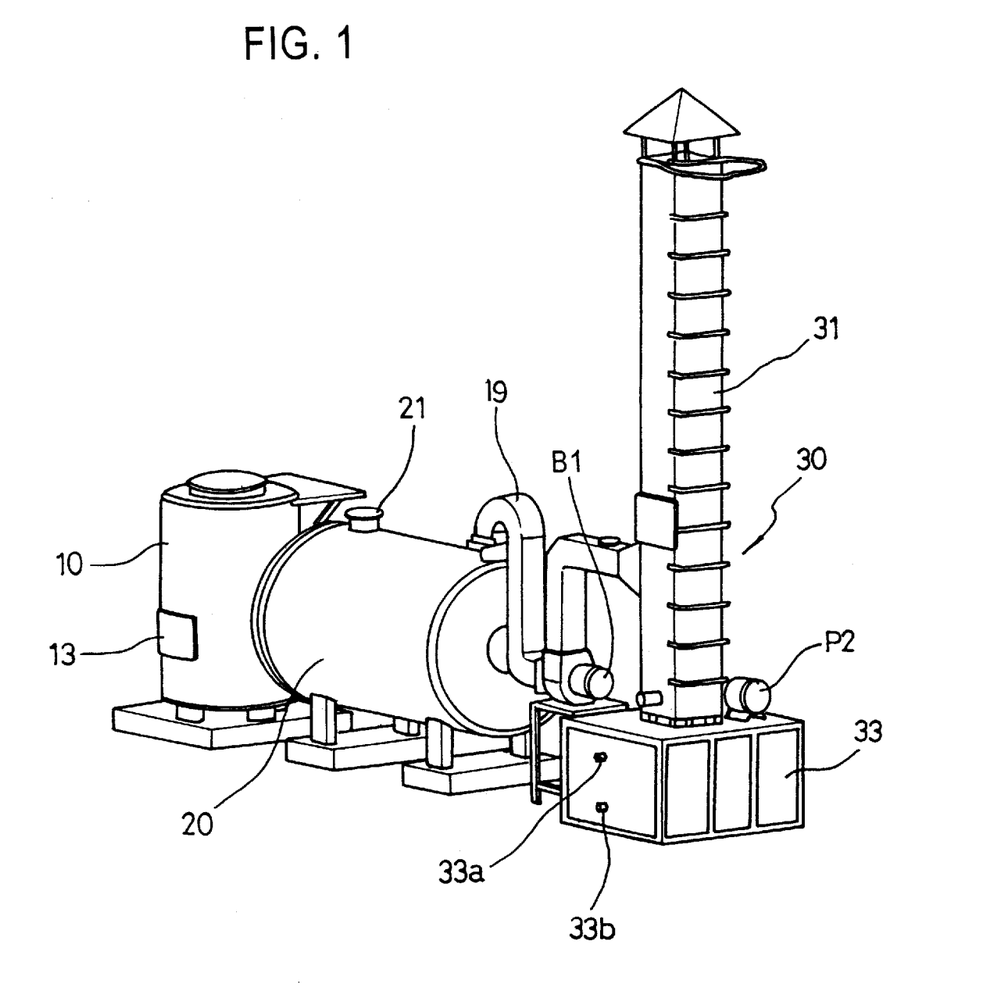
FIG. 1 is a schematic perspective view showing a scrapped tire boiler system according to the present invention.
Figure 2:
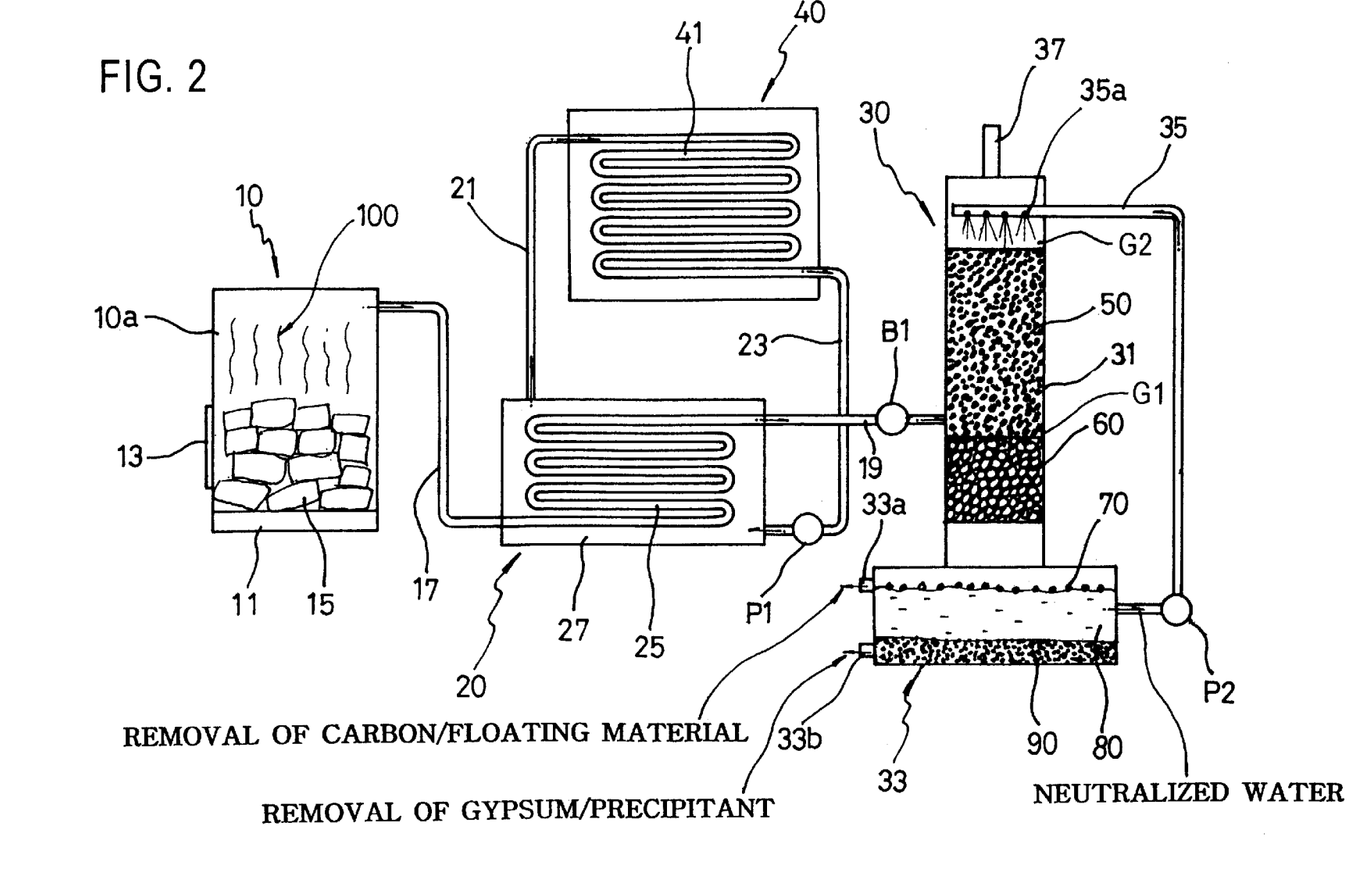
FIG. 2 is a sectional view showing the internal structure of the scrapped tire boiler system shown in FIG. 1.

Referring to FIGS. 1 and 2, a scrapped tire boiler system includes a burner furnace 10 for burning scrapped tires 15 and producing high-temperature combustion gas 100, a heat exchanger 20 for heating an internal cooled water by the high-temperature combustion gas 100, and an exhaust gas purifier 30 for removing a pollutant contained in the combustion gas 100 heat-exchanged in the heat exchanger 20 and discharging an exhaust gas in the air. The warm or hot water heat-exchanged in the heat exchanger 20 circulates a heating pipe 41 of a facility to be heated such as a gardening facility house or a vinyl plastic hot house 40 to perform a heat exchange, in which a supply pipe 21 and a return pipe 23 are connected to the heat exchanger 20.

Referring to FIG. 2, the structure of the scrapped tire burning apparatus will be described below in more detail. First, the burner furnace 10 is provided with a charging inlet 13 for putting scrapped tires therein, a spacing chamber 10a for charging the scrapped tires therein, and a burner 11 for heating the scrapped tires 15 on the bottom side thereof.

In order to transfer a high-temperature and high-pressure combustion gas 100 generated during burning the scrapped tires 15 to a heating pipe 25 in the heat exchanger 20, a first gas transfer pipe 17 is connected between the upper side of the burner furnace 10 and one end of the heating pipe 25 installed in the heat exchanger 20. A second gas transfer pipe 19 is connected between the other end of the heating pipe 25 and the central portion of an exhaust gas tower 31. A blower BI is installed in somewhere along the second gas transfer pipe 19 in order to smoothly transfer and discharge the combustion gas 100.

Meanwhile, the heating pipe 25 in the heat exchanger 20 is heated by the passage of the high-temperature combustion gas 100. Accordingly, cool water charged in the heat exchanger 20 is changed into warm water. Also, in order to transfer the warm water heated in the heat exchanger to the heating pipe 41 in a vinyl plastic hothouse, the supply pipe 21 communicates between the upper side of the heat exchanger 20 and one end of the heating pipe 41 of the vinyl plastic hothouse 40. Also, in order to recirculate the cooled water which has been heat-exchanged via the heating pipe 41 to the heat exchanger 20, the return pipe 23 communicates between the other end of the heating pipe 41 and the bottom side of the heat exchanger 20. A circulation pump P1 is installed in somewhere along the return pipe 23 in order to effectively circulate the recirculated water between the heating pipe 41 of the vinyl plastic hothouse 40 and the heat exchanger 20.

Meanwhile, the exhaust gas purifier 30 includes the exhaust gas tower 31. A plurality of charging units 50 of approximately 4 meters high are installed in the inner central portion of the exhaust gas tower 31, in order to increase a contact area and time between the combustion gas 100 input via the second gas transfer pipe 19 and the water 80. It is preferable that the second gas transfer pipe 19 is positioned to communicate with the bottom side of the charging units 50 so that a contact time between the combustion gas 100 input into the charging units 50 and the plurality of charging units 50 is lengthened. Also, a limestone charging layer 60 for removing sulphuric components S of the sulfurous acid gas ($SO_2$) by precipitation is disposed on the bottom side of the charging units 50, so that the limestone charging layer 60 is spaced by a predetermined distance from a water tank 33 communicating with the bottom side of the exhaust gas tower 31.

Meanwhile, a water spraying pipe 35 protrudes to spray water downwards from the upper side of the exhaust gas tower 31, that is, toward the charging units 50. Also, the other end of the water spraying pipe 35 extends to communicate with the central portion of the water tank 33. A circulation pipe P2 for recirculating water 80 charged to the water tank 33 into the inside of the exhaust gas tower 31 via the water spraying pipe 35 is disposed in the lower side of the water spraying pipe 35.

Figure 3:
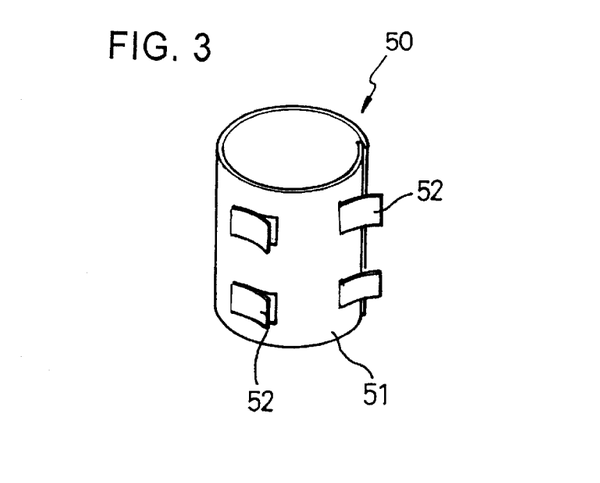
FIG. 3 is an enlarged perspective view showing an example of a charging unit to be used in an exhaust gas purifier.

Each of the plurality of charging units 50 filled in the exhaust gas tower 31 is made of a cylindrical vessel 51 having a plurality of contact opening pieces 52 formed on the lateral surface of the cylindrical vessel 51 and made of a solid fire-resistant material, in order to lengthen a contact time between the combustion gas 100 and the water 80 sprayed from the upper side of the charging units 50 during discharging the combustion gas 100 via a chimney 37 of the exhaust gas tower 31, that is, in order to increase a contact area, e.g., between the combustion gas 100 and the water 80 as shown in FIG. 3.

It is also possible to form the charging units 50 to have a rectangular shape or a polygonal shape. It is also possible to use a fire-resistant plastic, ceramic, or a gravel, for example, a fire-resistant material having a certain shape as a material of the charging units 50.

Meanwhile, on the upper portion of the water tank 33 is formed a first discharging outlet 33a having a predetermined diameter in order to remove carbon dust floating on the upper side of the water. On the lower portion of the water tank 33 is formed a second discharging outlet 33b in order to remove gypsum sunk in the purifying water.

The effect and function of the present invention as constructed above will be described below in more detail.

First, a plurality of scrapped tires on the whole or in pieces are charged into the spacing 10a of the burning furnace 10, via the charging inlet 13 of the burning furnace 10, and then the burner 11 is turned on to operate to heat the scrapped tires 15.

Accordingly, the scrapped tires are burnt to generate a high-temperature and high-pressure combustion gas 100. The combustion gas 100 passes through the first gas transfer pipe 17 and then passes through a wrinkled heating pipe 25 in the heat exchanger 20.

The water 27 charged in the inside of the heat exchanger 20 is heated by the heating pipe 25 so that the temperature rises up to a predetermined temperature. The temperature-risen water, that is, warm water passes through the supply pipe 21 according to operation of the circulation pump P1, to move along the heating pipe 41 installed under and/or on the ground of the vinyl plastic hothouse 40, and to heat the air under and/or on the ground of the vinyl plastic hothouse 40.

Thereafter, the warm water having passed through the low-temperature underground or ground heating pipe 41 falls down in temperature, and circulates to the heat exchanger 20 via the return pipe 23 by the circulation pump P1. In this case, it is possible to regulate the temperature of the vinyl plastic hothouse 40 by setting an operation time of the circulation pump P1.

Meanwhile, the combustion gas 100 whose temperature has been lowered via a heat-exchange process in the heating pipe 25 is transferred to the exhaust gas tower 31 of the exhaust gas purifier 30 along the second gas transfer pipe 19 by the blower B1, and then smeared from the bottom side rising up to the upper side in the charging units 50. The combustion gas 100 sufficiently contacts to water sprayed from the water spraying pipe 35 when the combustion gas 100 rises up via the plurality of charging units 50. At this time, the sulfurous acid gas ($SO_2$) contained in the combustion gas 100 is dissolved in the water. Then, the water in which the sulfurous acid gas ($SO_2$) has been dissolved passes through a limestone $CaCO_3$ in the limestone charging layer 60 and flows downwards.

Then, the sulfurous acid gas ($SO_2$) dissolved in the water $H_2O$ passes through the limestone 60a and reacts with the limestone 60a to form gypsum 90 $CaSO_4$. Since the gypsum from which humidity is not removed is soluble to a degree, it is charged into the water tank 33 formed in communication with the lower side of the exhaust gas tower 31. In this case, part of the gypsum $CaSO_4$ clings to the surface of the limestone $CaCO_3$ according to lapse of time. Thus, when the purifier is used for a long time, a reaction capability of the sulfurous acid $SO_2$. $H_2O$ remarkably deteriorates by the gypsum coated on the surface of the limestone. Thus, a countermeasure for preventing a reaction capability from lowering while keeping a small-scale boiler system is needed.

For this purpose, it is crucial that the gypsum $CaSO_4$ is consistently removed from the surface of the limestone 60a by a proper water pressure prior to being dried. It is also important that the flow of the water is kept at the state where the limestone 60a is not exposed in the air from the water charged in the water tank 33.

Meanwhile, the purifying water 80 from which acidity has been removed by reaction with the limestone is sprayed via spraying holes 35a of the water spray pipe 35 by the circulation pump P2 connected on the bottom side of the water spray pipe 35, and is circulated in the exhaust gas tower 31.

At the same time, the carbon dust 70 contained in the combustion gas 100 flows into the water tank 33 by the water sprayed in the water spray pipe 35 and floats on the water 80 charged in the water tank 33. Thus, the carbon dust 70 floating on the water is collected via the first discharging outlet 33a installed in the level similar to the water level at an appropriate time, and the gypsum $CaSO_4$ sunk on the bottom surface of the water tank 33 is removed via the second discharging outlet 33b at an appropriate time.

As described above, the combustion gas 100 purified during the above repetitive process is discharged in the air via the chimney 37 of the exhaust gas tower 31.

Figure 5:
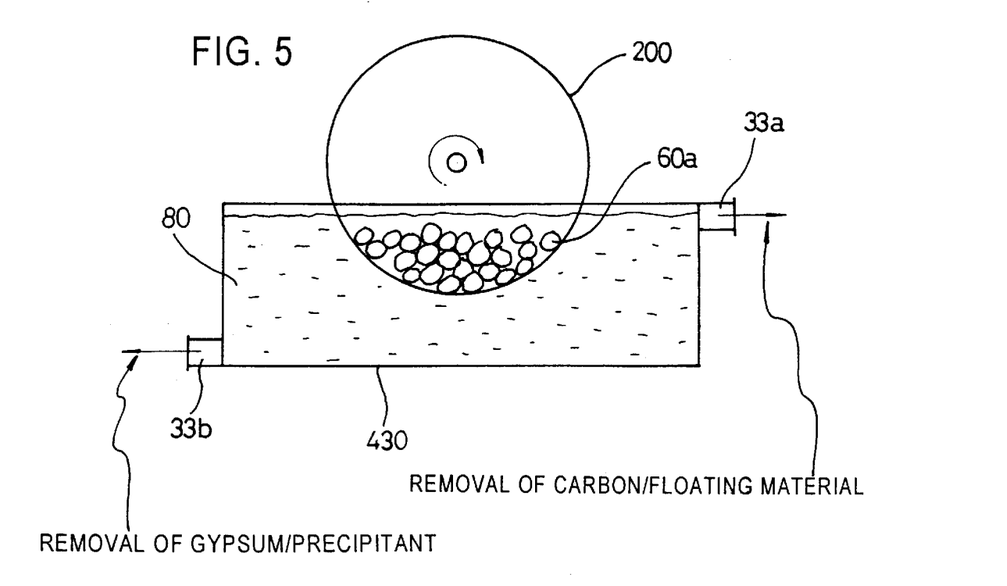
FIG. 5 is a schematic sectional view of a water tank having a sulfurous acid reaction accelerating structure using a rotary stirrer in the exhaust gas purifier.

Meanwhile, the structure for solving the phenomenon that a reaction capability with the sulfurous acid $SO_2$. $H_2O$ due to the gypsum coated on the surface of the limestone is shown in FIG. 5. As depicted, a rotary stirrer 200 is inserted and rotated into the purifying water in the water tank 430, in which a limestone 60a is charged in the inside of the rotary stirrer 200. In this case, gypsum $CaSO_4$ coated on the surface of the limestone 60a is removed according to lapse of time.

Figure 6:
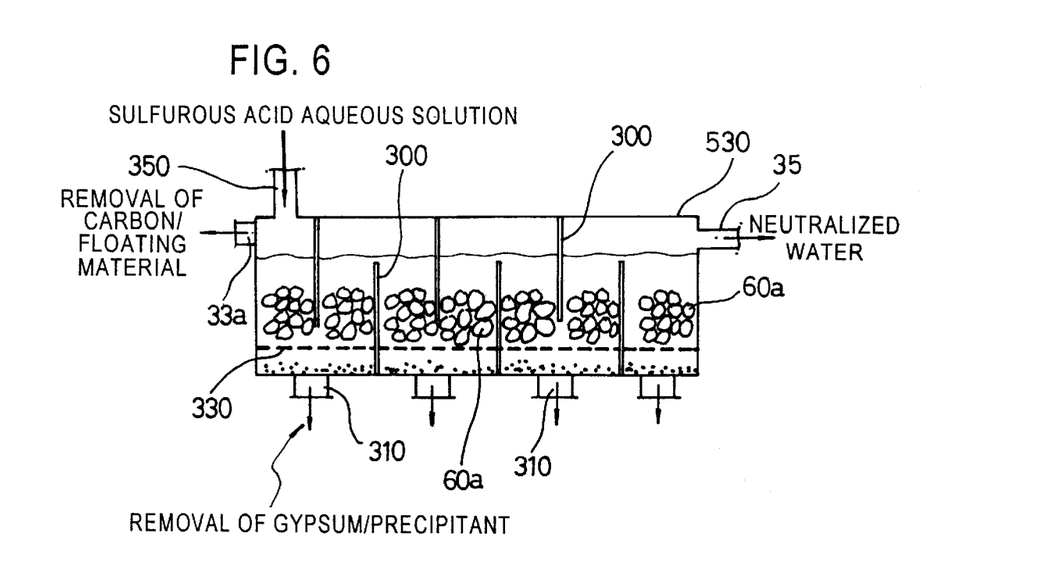
FIG. 6 is a schematic sectional view of a water tank having a sulfurous acid reaction accelerating structure using a chemical material in the exhaust gas purifier.

Alternatively, a method for dissolving gypsum is shown in FIG. 6. As shown, a chemical transfer pipe 350 is installed in one side of the water tank 530. A plurality of partition walls 300 of which one end is fixed in the inside of the water tank 530 alternately up and down are formed in the water tank 530. A predetermined limestone 60a is charged between the partition walls 300. In this case, hydrogen peroxide $H_2O_2$ is added in the water tank 530 as a solvent for dissolving the gypsum.

Also, in the inner lower portion of the water tank 530 is formed a screen filter 330 for separating gypsum in order to precipitate the gypsum produced after the sulfurous acid aqueous solution has reacted with the limestone on the bottom floor of the water tank. On the bottom surface of the water tank are formed a plurality of gypsum removal holes 310 for removing the gypsum and precipitant. Thus, the purified water while passing through the inside of the water tank is circulated into the water spray pipe 35 in the exhaust gas tower 31.

Figure 7:
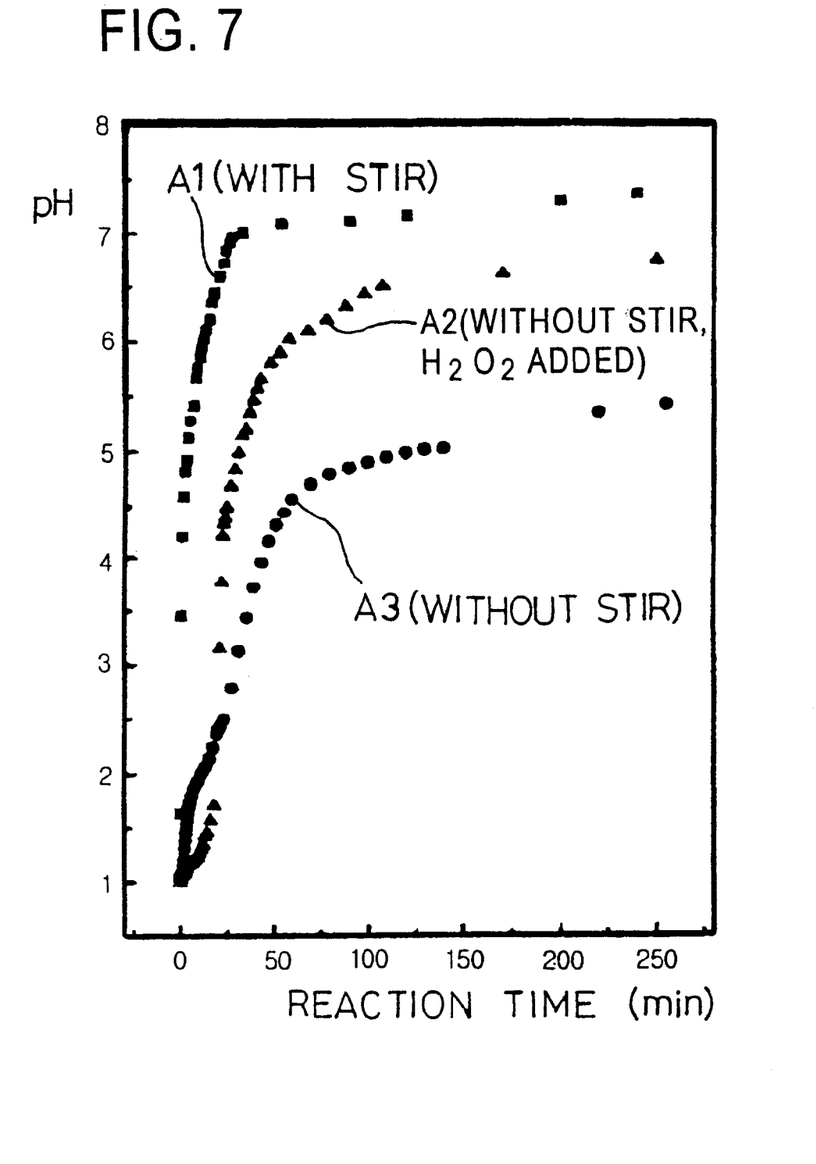
FIG. 7 is a graphical view showing the change of the pH values according to time in the cases that the sulfurous acid reaction accelerating structure has been employed or not employed.

FIG. 7 is a graphical view showing the measured results of the pH values according to reaction time in the cases that A1) the limestone is stirred, A2) the hydrogen peroxide is added in the sulfurous acid gas aqueous solution, and A3) the limestone is not stirred. As shown in these graphs, a reaction velocity in the case A3 that the limestone is not stirred is remarkably lowered compared with the case A1 that the limestone is stirred. In the case A2 that the hydrogen peroxide is added in the water tank, an efficient chemical reaction can be obtained without a mechanical stirring operation.

Figure 4:
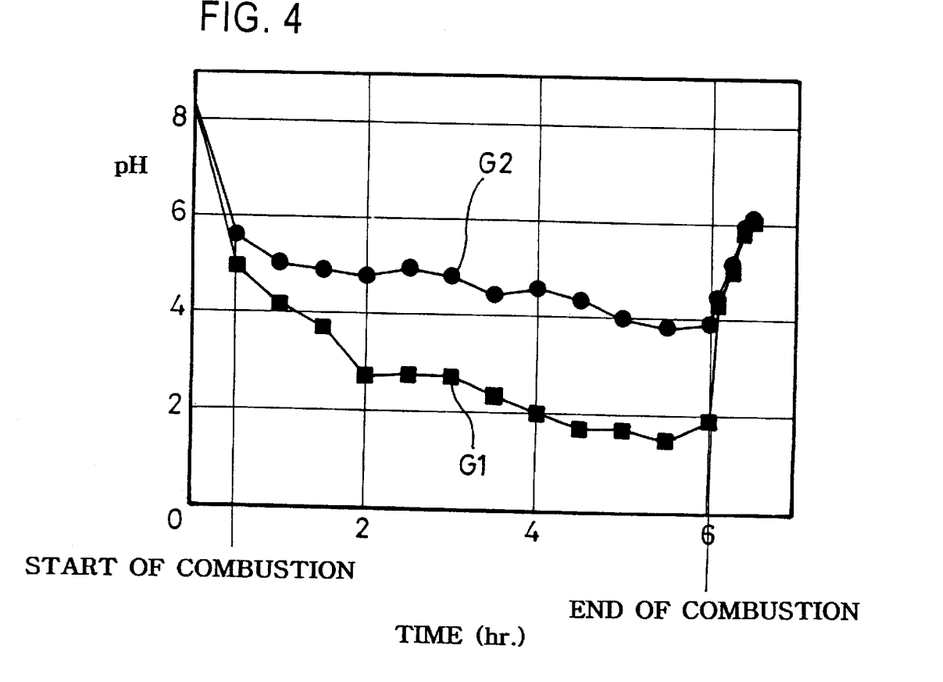
FIG. 4 is a graphical view showing the change of the pH values of a combustion gas G1 before passing through the charging units and a combustion gas G2 after having passed through the charging units, according to time, in the exhaust gas purifier.

Meanwhile, scrapped tires of 500 Kg are charged into the burner furnace 10 to heat them for 15 hours in order to test a sulfurous acid gas removal capability of the exhaust gas purifying apparatus 30 and a reduction reaction result of the limestone according to lapse of time. At this time, it can be seen from FIG. 4 that the changes of the pH value with respect to the combustion gas G1 taken before passing through the charging units 50, that is, from the lowest portion of the charging units 50, and the combustion gas G2 after passing through the charging units 50, that is, taken from the upper portion of the charging units 50 differ from each other remarkably. That is, the combustion gas G1 before passing through the charging units appears as a strong acidity, and the combustion gas G2 after having passed through the charging units appears as a weak acidity. It can be seen that the sulfurous acid gas ($SO_2$) can be effectively removed from the exhaust gas having passed through the exhaust gas purifying apparatus 30.

Also, the pH value of the combustion gas becomes a strong acidity as combustion reaches the last stage of combustion. Since combustion gas is not generated any more if combustion finishes, the pH value of the combustion gases G1 and G2 are same.

In the present invention, the content of the sulfurous acid gas in the combustion gas discharged in the air is detected lower than an environmental standard reference value of 800 ppm. Also, it can be seen that the carbon dust has been almost removed.

Meanwhile, when the scrapped tires are burnt, the fuel gas is extracted by rubber components in the scrapped tires to generate a large amount of sulfurous acid gases. However, in the last stage when the rubber components are dried by distillation and thus the fuel gas is not extracted any more, that is, in the ash processing period for the last three to five hours, the scrapped tires' ashes remain and thus the content of the sulfurous acid gases in the combustion gas is sharply reduced. However, the content of the hydrogen carbon monoxide is increased in geometrical progression referring to FIG. 9.

In the above ash processing period, it is not possible to extract the fuel gas, and thus heating power cannot be supplied to the boiler system. In this case, since the hydrogen carbon monoxide being a pollutant is discharged in the exhaust gas, the shorter ash processing period the better. It is not possible to remove the hydrogen carbon monoxide by the wet purifying method, differently from the sulfurous acid gas. Also, the concentration of the hydrogen carbon monoxide is high and the discharge time thereof is long.

Figure 8:
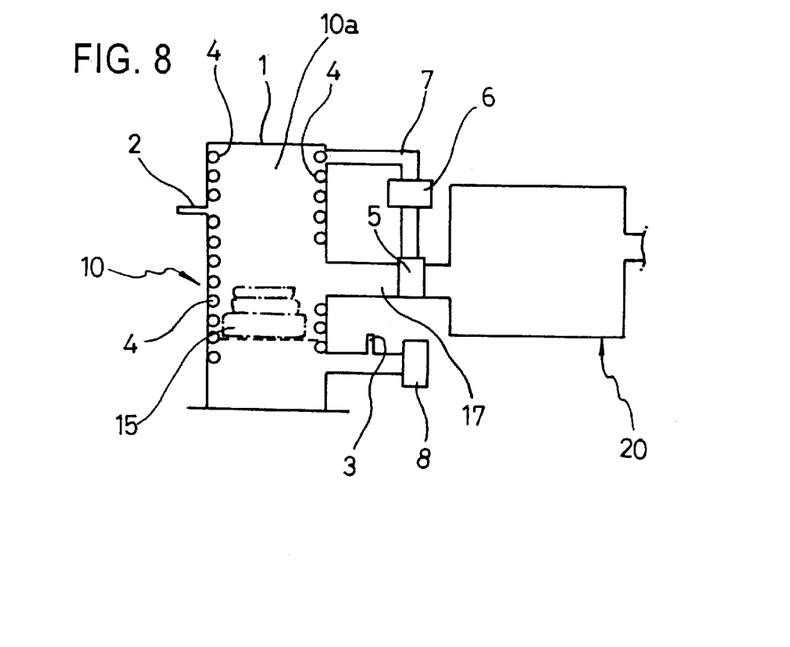
FIG. 8 is a sectional view showing a detailed structure of the scrapped tire burner furnace shown in FIG. 1.

FIG. 8 shows a scrapped tire burner furnace which can reduce a discharge time and discharge amount of the hydrogen carbon monoxide.

The burner furnace 10 according to the present invention is comprised of a housing 1 forming a combustion chamber 10a in which scrapped tires 15 are charged, a first light oil inlet 2 disposed in the upper portion of the combustion chamber 10a, for injecting a combustible material, for example, light oil, an air heating induction pipe 4 disposed in the inner circumferential surface of the housing, a burner 5 disposed in a first gas transfer pipe 17 connected with a heat exchanger 20, a return fan 6 for returning the air heated by the burner 5 to the combustion chamber 10a, and a return pipe 7.

Also, the burner furnace 10 further includes a second light oil inlet 3 disposed in the lower portion of the combustion chamber 10a and a fan 8 for injecting the input light oil into the combustion chamber 10a together with the cool air.

In the above burner furnace 10, the rubber components in the charged scrapped tires 15 are all burnt. Thus, if light oil is injected at the time when the fuel gas supplied from the burner furnace 10 to the heat exchanger 20 is interrupted, the housing 1 of the burner furnace 10 and the first gas transfer pipe 17 have been already heated up to a high temperature. Accordingly, the light oil vaporizes. The vaporized light oil is transferred toward the heat exchanger 20 together with the hydrogen carbon monoxide generated during imperfect combustion.

At this time, if the burner 9 positioned in the inlet side of the heat exchanger, that is, the first gas transfer pipe 17 is ignited, the light oil vapor is ignited, and thus the hydrogen carbon monoxide is oxidized into hydrogen carbon dioxide. Thus, there is no hydrogen carbon monoxide in the exhaust gas. As described above, when light oil is injected in the processing of the ash, the injection amount of cool air can be increased to thereby largely shorten the ash processing period.

By experiment, the ash processing time which is taken five hours or so in the case that the scrapped tires of 500 Kg are charged can be shortened less than one hour by injecting light oil. As the air inlet amount increases, the light oil vapor is diluted. Accordingly, the combustion state of the burner 5 gets worse and the content of the hydrogen carbon monoxide increases in the exhaust gas. Also, since the ash processing period is lengthened if the air inlet amount becomes smaller, the amount of the light oil needed in the ash processing period increases. Thus, it is preferable that the air inlet amount and the light oil injection amount are optimized according to the scale of the apparatus.

In the case of injection of the light oil, the light oil can be injected via the second light oil inlet 3 together with cool air, or can be injected over the ash via the first light oil inlet 2 irrespective of the cool air. By the experimental results, the case that light oil is injected over the ash via the first light oil inlet 2 can save the amount of light oil needed for the ash processing, when compared with the case that the light oil is injected together with cool air from the bottom via the second light oil inlet 3 by the fan 8, which is however not effective for removal of the hydrogen carbon monoxide.

Figure 9:
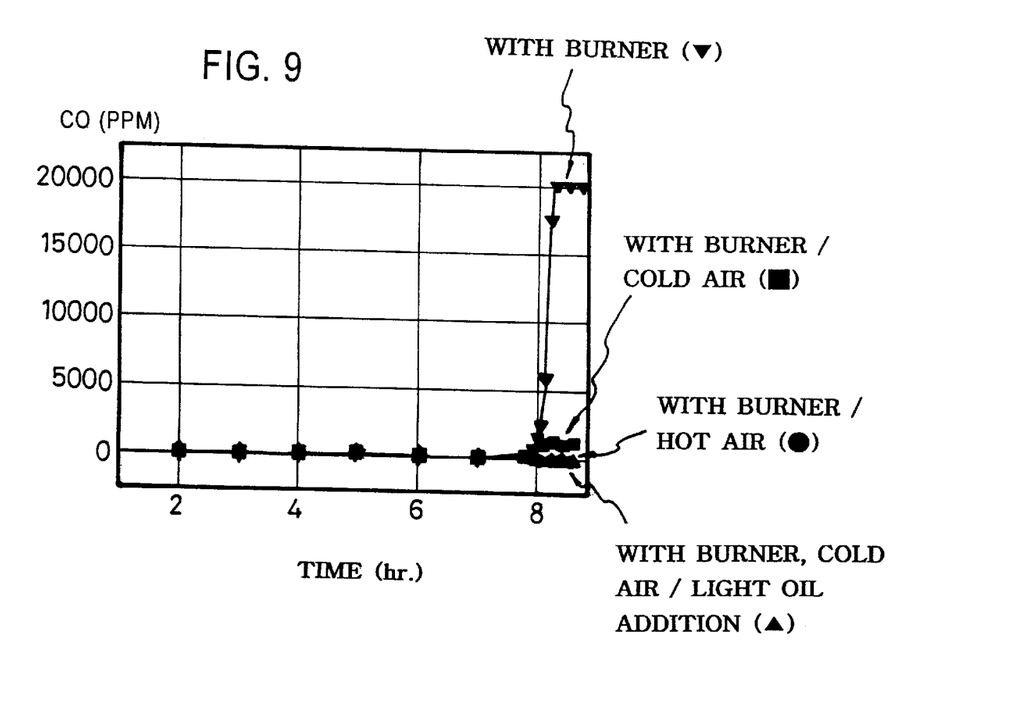
FIG. 9 is a graphical view showing an amount of nitrogen carbon monoxide generated in the cases of a general burner furnace and the present invention burner furnace.

Meanwhile, in the case that warm air produced by the burner 5 is made to return to the combustion chamber 10a via the return pipe 7 by operation of the fan 6, instead of the cool air, the thermal efficiency of the boiler 70 is enhanced and the ash processing time and the amount of the light oil needed for the ash processing can be effectively reduced. In each case, the change of time with respect to the amount of the hydrogen carbon monoxide generated is shown in FIG. 9.

In the above embodiment, the height of the charging material layer in the exhaust gas tower 31 is made to be 4 meters or so, to be adapted for a small-scale heating boiler system. However, as the structure of the charging units 50 is optimally made to have an exhaust gas to be smoothly discharged and the contact time of the water is lengthened and the height of the exhaust gas tower 30 is increased, it is possible to furthermore enhance a capability of removing a pollutant. Also, as the burner furnace 10, the heat exchanger 20 and the exhaust gas purifying apparatus 30 are enlarged in scale, it is possible to use the present invention as an industrial medium-sized boiler system.

Therefore, although the scrapped tires require a facility investment such as an expensive air purifier for processing the sulfurous acid gas and the carbon dust, the present invention can use cheap scrapped tires as a fuel resource and secure the thermal source of the heat exchanger. Also, the present invention can prevent an air pollution due to the pollutant. The heat exchanger is appropriate for heating of a small-scale area of 15,000 $m^2$ or so, in particular, for heating a gardening vinyl plastic hothouse. In view of the size of the apparatus, the size of the exhaust gas tower is minimized by using the charging units material of the appropriate shape.

In addition, the water circulated in the water tank which is obtained as a by-product in the purifier according to the present invention can be used for preventing or curing powdery mildew fatal to roses. The finite carbon powder is mixed with a plastic material for home appliances to be used for generating a color. The gypsum also can be used as a multiple purpose. The present invention can solve the environmental problem and enable the application of the by-product.

Thus, the boiler system according to the present invention can be effectively applied to a small-scale heating apparatus such as a vinyl plastic hothouse using cheap scrapped tires as fuel without discharging pollutants.

As described above, the present invention has been described as particularly preferred embodiments. However, the present invention is not limited in the above embodiments and various modifications and changes are possible by one skilled in the art within the scope without departing from the spirit of the present invention.

What is claimed is:

1. A small-scale scrapped tire boiler system for heating a small-scale facility to be heated using heat generated during burning scrapped tires, the small-scale boiler system comprising:

a scrapped tire burner furnace for burning the scrapped tires and producing high-temperature combustion gas;

a heat exchanger receiving the high-temperature combustion gas generated in the burner furnace and a heat transfer medium circulating between the facility to be heated and the heat exchanger, a temperature of the heat transfer medium provided by the heat exchanger to the facility to be heated being higher than the temperature of the heat transfer medium received by the heat exchanger from the facility to be heated;

a gas purifier receiving the combustion gas from the heat exchanger after heat exchange between the high-temperature combustion gas and the heat transfer medium, purifying the combustion gas by removing sulfurous acid gas and carbon dust contained in the combustion gas, and then discharging the purified combustion gas into the air, said gas purifier including
      a gas tower having a vertical path to discharge the purified combustion gas,
      a water sprayer for spraying water from the upper side of the gas tower in such a manner that the sulfurous acid gas contained in the discharged combustion gas is made to dissolve in the water and the carbon dust contained in the discharged combustion gas is made to absorb in the water, the water falling downward after being spayed by the sprayer, and
      a neutralizer material receiving the water falling downward after being sprayed by the sprayer, the neutralizer material providing neutralized water by precipitating the sulfurous acid gas dissolved in the water into alkali salts in a sulfurous acid aqueous solution;

a processing tank receiving the sulfurous acid aqueous solution, the neutralized water and the neutralizer material;

at least one first discharging outlet for removing a precipitant fallen to a floor of the processing tank;

a second discharging outlet for removing a material floating on an upper portion of the processing tank; and a circulator having a water outlet in a middle portion of the processing tank between said first discharging outlet and said second discharging outlet, for circulating the neutralized water to said water sprayer.

2. The small-scale scrapped tire boiler system according to claim 1, further comprising a delay mechanism for delaying discharge of the combustion gas so that a contact time between the combustion gas received from the heat exchanger and the sprayed water is sufficient to remove the sulfurous acid gas and carbon dust contained in the combustion gas.

3. The small-scale scrapped tire boiler system according to claim 2, wherein said delay mechanism is comprised of a plurality of charging units stacked together, each charging unit being made of a cylindrical body, on a lateral surface of which a plurality of contact opening pieces arc formed in an opened structure.

4. The small-scale scrapped tire boiler system according to claim 1, wherein said burner furnace comprises:

a housing forming a combustion chamber in which scrapped tires are loaded;

a first inlet disposed in an upper portion of the combustion chamber, for injecting a combustible material;

an air heating induction pipe disposed in an inner circumferential surface of the housing;

a burner disposed in a connection path with the heat exchanger; and a return means for returning the high-temperature combustion gas in the connection path to the combustion chamber.

5. The small-scale scrapped tire boiler system according to claim 4, wherein said burner furnace further comprises a second injection inlet disposed in a lower portion of the combustion chamber, for injecting a combustible material, and a fan for injecting the input combustible material into the inside of the combustion chamber together with external air.

6. The small-scale scrapped tire boiler system according to claim 1, wherein said neutralizer material comprises a limestone charging layer.

* * * * *